(12) United States Patent
Colvin et al.

(10) Patent No.: US 8,028,031 B2
(45) Date of Patent: Sep. 27, 2011

(54) DETERMINING EMAIL FILTERING TYPE BASED ON SENDER CLASSIFICATION

(75) Inventors: Ryan Colvin, Bothell, WA (US); Chad Mills, Redmond, WA (US); Robert McCann, Fall City, WA (US); Geoff Hulten, Lynnwood, WA (US); Harry Katz, Bellevue, WA (US); Eriola Kruja, Toronto (CA); Xin Huang, Bothell, WA (US); Joshua Korb, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 318 days.

(21) Appl. No.: 12/147,490

(22) Filed: Jun. 27, 2008

(65) Prior Publication Data

US 2009/0327430 A1   Dec. 31, 2009

(51) Int. Cl.
*G06F 15/16* (2006.01)
*G06F 12/00* (2006.01)
(52) U.S. Cl. ........................................ 709/206; 709/207
(58) Field of Classification Search .................. 709/206, 709/207, 223–229, 250
See application file for complete search history.

(56) References Cited

U.S. PATENT DOCUMENTS

| 6,829,613 | B1 | 12/2004 | Liddy |
| 6,941,466 | B2 | 9/2005 | Mastrianni |
| 7,206,814 | B2 | 4/2007 | Kirsch |
| 7,487,217 | B2 * | 2/2009 | Buckingham et al. ........ 709/206 |
| 2004/0177120 | A1 * | 9/2004 | Kirsch ........................... 709/206 |
| 2004/0215977 | A1 | 10/2004 | Goodman et al. |
| 2005/0065906 | A1 | 3/2005 | Romero |
| 2005/0108340 | A1 | 5/2005 | Gleeson et al. |
| 2005/0198159 | A1 * | 9/2005 | Kirsch ........................... 709/206 |
| 2006/0015942 | A1 | 1/2006 | Judge et al. |
| 2006/0031314 | A1 | 2/2006 | Brahms et al. |
| 2006/0168024 | A1 * | 7/2006 | Mehr et al. ..................... 709/206 |
| 2006/0224673 | A1 | 10/2006 | Stern et al. |
| 2009/0037469 | A1 * | 2/2009 | Kirsch ........................ 707/104.1 |
| 2009/0064323 | A1 * | 3/2009 | Lin ................................ 726/22 |
| 2009/0216905 | A1 * | 8/2009 | Adelman et al. .............. 709/245 |

OTHER PUBLICATIONS

Gansterer, "A Reliable Component-based Architecture for E-Mail Filtering", Proceedings of the The Second International Conference on Availability, Reliability and Security, 2007, ISBN:0-7695-2775-2, pp. 43-52.
Diao, "A comparative study of classification based personal e-mail filtering", In Proceedings of PAKDD-00, 4th Pacific-Asia Conference on Knowledge Discovery and Data Mining, pp. 408-419, Kyoto, JP, 2000. Springer Verlag. 6.
DMTP: Controlling Spam Through Message Delivery Differentiation, Techinical Report, TR-041025, Computer Science Department, Florida State University, Oct. 2004, 10 Pgs.

* cited by examiner

*Primary Examiner* — Zarni Maung

(57) ABSTRACT

Determining email filtering type based on sender classification. Incoming email is accessed and a sender of the incoming email is identified. The reputation of the sender of the incoming email is determined. An email sender classification is made based on the reputation of the sender. A determination of the type of filtering operations to be performed by an email filter on the email is made based on the classification. The parameters of the type of filtering operations to be performed are determined. The parameters of the type of filtering operations to be performed are provided to the email filter.

20 Claims, 5 Drawing Sheets

US 8,028,031 B2

DETERMINING EMAIL FILTERING TYPE BASED ON SENDER CLASSIFICATION

BACKGROUND

Email filtering involves the processing of email for forwarding, redirecting or deletion according to predetermined criteria. Most often email filtering refers to the automatic processing of incoming email but can also involve human intervention as well. Email filtering software accesses email as inputs and as an output can either cause an email message to pass through the filtering process unchanged for delivery to a user's email message mailbox, redirect the email message for delivery elsewhere, or even throw the email message away.

Spammers send unsolicited bulk email or unsolicited commercial email that is referred to as "spam". Spam can refer to the unsolicited bulk or commercial email itself or to its content. Spammers attempt to devise email messages that contain spam that can penetrate email filters and be delivered to targeted email users. Spammers use various techniques in order to fashion email messages that can penetrate an email filter. One approach taken by spammers involves running test messages through spam filters in order to determine the words and other email attributes that the spam filters consider to be legitimate. By adding sufficient numbers of words and attributes that are considered to be legitimate to an email message that contains spam, an email filter can be led to classify the email message as legitimate and to allow it to pass through to the email message mailbox of targeted users.

Some conventional spam filtering systems that use email message sender reputation information as a criteria for determining how an email filter handles an email message, provide email message senders with a reputation "score" that is used in conjunction with a content based "score" to form a combined score that is used to classify email messages from that email message sender. Accordingly, in such conventional spam filtering systems the reputation score of the email message sender only constitutes a part of the basis for a decision of how to filter an email message irregardless of the nature or magnitude of the reputation score accorded the email message sender: (1) good, (2) poor, or (3) neutral.

It should be appreciated that the aforementioned use of reputation information related to email senders can contribute to unsatisfactory filtering results as it relates to certain types of email senders. Another shortcoming of conventional email filtering systems is that all email is subjected to the same content filter, the same network policies (such as hourly throttling limits, connection limits, etc.), and the same delivery options: (1) inbox, (2) junk, or (3) delete in spite of reputation.

The character of some email reputation information is problematic for conventional email filtering systems such as email sender reputation information that is inconclusive. For example, reputation information for email senders who are very low volume senders can be weak and may not provide an accurate estimation of the likelihood that the email that the email sender is sending is undesirable. Moreover, reputation information for mixed email message senders who forward email messages, send gray mail (newsletters, legitimate advertisements) or forward aggregate data (e.g., newsgroups) is often inconclusive. Likewise, reputation information for infrequent email senders who send high volumes of email can be inconclusive.

Conventional email filters such as those which are discussed above can be frustrated by spammers who overload email messages subject to receiving a poor sender reputation score with legitimate content (e.g., content determined to be satisfactory or desirable for forwarding to a user). In this manner the spammers raise the overall score of the email message above that which qualifies it as legitimate. In addition, the lack of selectivity of conventional filters, as it regards email sent from senders with inconclusive reputations, results in excessive false positive identifications of bad email. This is because conventional email filters do not have the capacity to identify good email sent from such senders. It should be appreciated that such excessive false positives can result in the elimination of substantial amounts of desirable email. Accordingly, conventional email filters ineffectively use reputation information which significantly degrades their overall performance.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Email filtering involves the processing of email for forwarding, redirecting or deletion according to predetermined criteria. Some email filters use sender reputation information to determine the likelihood that email is legitimate or spammy. Such conventional email filters can be frustrated by having bad reputation scores outweighed by the addition of legitimate content to a spammy email. Additionally, some email filters do not have the capacity to identify legitimate email sent from mixed email senders (who send legitimate and spammy email). A methodology for determining email filtering type based on accurate sender classification is disclosed that overcomes these shortcomings of conventional email filters. As a part of the methodology, a classification of an email sender is used to determine the nature of the filtering operations that are to be performed by an email filter on email sent by the email sender. The sender classification is based on the reputation of the email sender and is selected from among several fine grained classifications. The sender classification has associated with it specific policies that correspond to filtering actions to be applied to the email. For example, in response to the receipt of email from the email sender, whether it is spammy email that is overloaded with legitimate content, mixed email, etc., the appropriate specifically defined filtering actions to be applied to that email are provided to the email filter, based on the email sender's classification.

BRIEF DESCRIPTION OF THE DRAWINGS

The accompanying drawings, which are incorporated in and form a part of this specification, illustrate embodiments and, together with the description, serve to explain the principles of the embodiments.

The drawings referred to in this description should not be understood as being drawn to scale except if specifically noted.

DETAILED DESCRIPTION

Reference will now be made in detail to various embodiments, examples of which are illustrated in the accompanying drawings. While descriptions will be provided in conjunction with these embodiments, it will be understood that the descriptions are not intended to limit the scope of the embodiments. On the contrary, the disclosure is intended to cover alternatives, modifications and equivalents, of these embodiments. Furthermore, in the following description, numerous specific details are set forth in order to provide a thorough understanding of embodiments. In other instances, well-known methods, procedures, components, and circuits have not been described in detail as not to unnecessarily obscure aspects of embodiments.

Figure 1A:
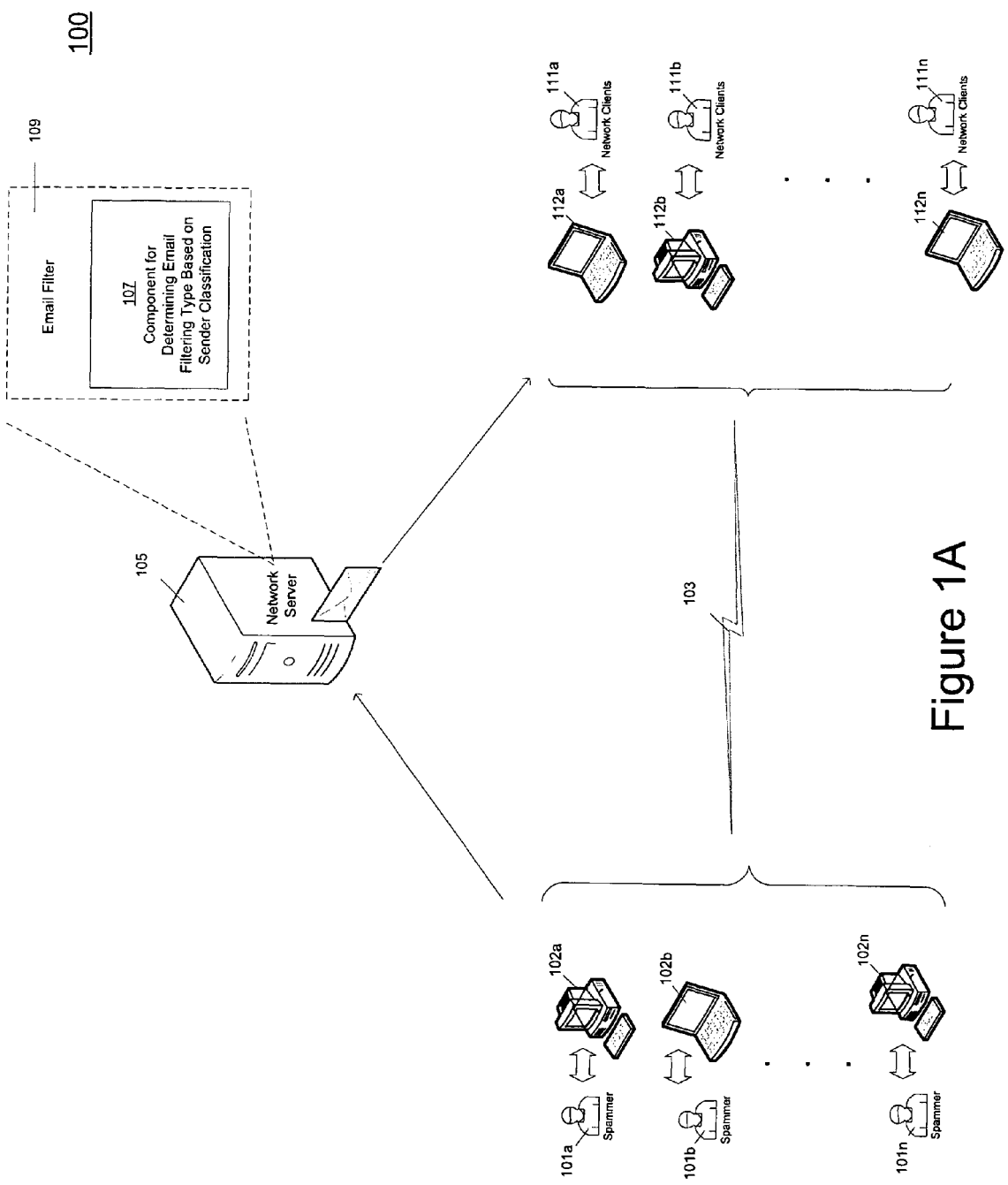
FIG. 1A shows an exemplary operational setting of a component for determining email filtering type based on sender classification according to one embodiment.

Exemplary Network Setting of a Component for Determining Email Filtering Type Based on Sender Classification According to Embodiments FIG. 1A shows an exemplary operational setting 100 of a component 109 for determining email filtering type based on sender classification according to one embodiment. The sender classification is based on the reputation of the email sender and is selected from among several fine grained classifications. In one embodiment, in response to the receipt of email from an email sender, component 109 identifies filtering actions to be applied to the email that are based on the email sender's classification. FIG. 1A shows email senders 101a-101n, network link 103, network server 105, email filter 107, component 109 and network clients 111a-111n.

Referring to FIG. 1A, email senders 101a-101n send email to network clients 111a-111n via network link 103. In one embodiment, network link 103 can be a public or a private network. In one embodiment, email senders 101a-101n can have good, poor or neutral reputations. Email senders with poor reputations can include spammers who send email messages that can include "work arounds" intended to thwart email filter 107. Also shown are computer systems 102a-102n associated with email senders 101a-101n.

Network server 105 services network clients 111a-111n. In one embodiment, network server 105 provides email services to network clients 111a-111n. In one embodiment, email filter 107 is an application program that executes on network server 105. In one embodiment, email filter 107 accesses incoming email messages and determines whether email messages are to be forwarded onward to intended network clients 111a-111n, "junked" or deleted. In one embodiment, email filter 107 can be installed either as a part of a network email program or separately for each network client 111a-111n.

Component 109 is an executable program that determines an email filtering type for email provided by a sender based on a reputation based classification of the sender. In one embodiment, component 109 provides a fined grained filtering approach to filtering incoming email that features the utilization of different types of filtering on incoming email based on the reputation based classification of the sender. In one embodiment, the different types of filtering have different sets of parameters which enable email from a variety of types of senders to be to be filtered with less false positive results than can be achieved using less granular filtering approaches. Parameters are discussed below with reference to Table 3.

In one embodiment, as a part of the herein described methodology for determining the type of filtering to use on incoming email, component 109 monitors incoming email and identifies the senders of the incoming email. Component 109 then determines the reputation of the email senders and based on the determined reputation of the email senders determines a sender classification (e.g., good sender, bad sender, mixed sender, mixed good, small good, small other, unknown, etc.). Component 109 then provides the sender classification to email filter 107.

As used herein the term "sender classification" is intended to refer to the process of using multiple data source classifications to classify senders into configurable categories. In one embodiment, each category can have policies and filtering actions that are specific to that type of sender, e.g., filtering tailored to a category to reduce false positives, filtering that limits senders in terms of volume and connections, and that deterministically punish spammers.

Component 109 is able to effectively manage email from senders with reputations that present challenges to conventional email filters such as email senders with very low volumes, mixed senders and senders with infrequent, but high volume sending patterns. In one embodiment, as it regards senders with very low volumes, because reputation data may be weak for such senders filtering can be performed less aggressively or emails of this type may not be deleted because of the lack of reputation information. For example, in one embodiment, reputation filtering can be disabled and content filtering used solely in such cases.

It should be appreciated that for mixed senders reputation data is often inconclusive (see Table 3 below). In one embodiment, as it regards mixed senders, e.g., senders who forward messages, send gray mails (newsletters, legitimate advertisements), or aggregate data (newsgroups), specialized content filter training (identifies legitimate or "good" content) and user safe listing can be employed where a user is prompted to determine if a sender should be added to the safe list. In one embodiment, content filter training is a global performance measure that affects all senders while prompting the user to determine if a sender should be added to a safelist is an individualized performance measure that enables users to override a global decision. In one embodiment, to facilitate user safe listing, filter deletions could be disabled for mail from this category to ensure mail reaches either the inbox or the junk folder of the associated email system.

In one embodiment, senders with infrequent, but high volume sending patterns can be separated into categories (see Table 3 below). In this manner, network throttling levels can be tailored to each type of sender and specified, rather than subjecting all such senders to similar levels.

For example, consider an email sender, 101a-101n, who sends approximately five emails per day to an email system each weekday (e.g., 110 emails per month). It should be appreciated that this volume is not sufficient to facilitate reputation scoring that accurately gauges email senders. Therefore, many conventional email systems would treat this email sender as an unknown email sender with aggressive filtering and high false positives. Many small businesses and home servers fall into this category and existing reputation based filtering systems are far too aggressive against these type email senders causing poor delivery experiences both for the email sender and the receiver.

In one embodiment, with the ability to classify senders into various categories component 109 is able to place consistent, low volume senders such as the above discussed email sender into a special category where network bandwidth is severely limited (as the email sender has no need to send large volumes to the email system) but filtering is more conservative and deletions are disabled. This approach provides smaller email senders with a much better experience while protecting the email system from spammer attacks from low volume 'Bot-Net' machines. These machines send low volumes before suddenly attacking for a short period with high volume spam.

In one embodiment, by using reputation data to classify email senders into various categories (see Table 3 that is discussed below), the ability to tailor filtering to each category is enabled. In one embodiment, each category can have a number of policies configured specifically for it. In this manner mistakes can be reduced for known email sender categories and overall filter accuracy can be improved. Escalations can be reduced and new or existing filtering technologies can be applied in a more granular way, affecting only the categories of email senders 101a-101n desired.

Network clients 111a-111n receive incoming emails that are sent by email senders 101a-101n. In one embodiment, emails that are intended for network clients 111a-111n are filtered by email filter 107. Moreover, in one embodiment, network clients 111a-111n are served by component 109 that categorizes the email sender and identifies the appropriate filtering policy to be applied to the email. Computer systems 112a-112n associated with network clients 111a-111n are also shown in FIG. 1A.

Operation

Figure 1B:
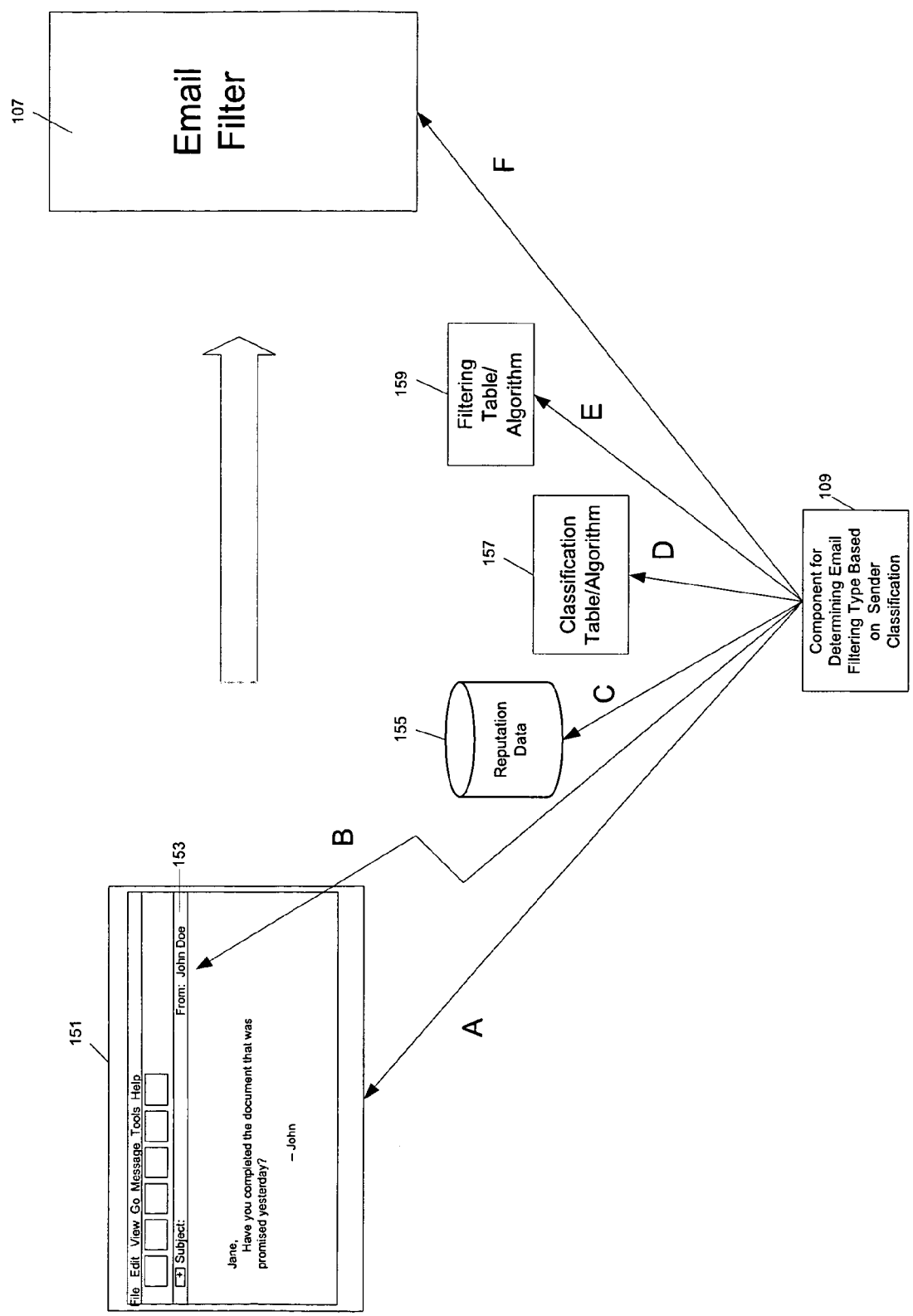
FIG. 1B illustrates operations A-F performed in process for determining email filtering type based on sender classification according to one embodiment.

FIG. 1B illustrates operations A-F performed in process for determining email filtering type based on sender classification according to one embodiment. These operations including the order in which they are presented are only exemplary. In other embodiments, other operations in other orders can be included.

Referring to FIG. 1B, at A, an incoming email 151 is accessed by component 109 for purposes of determining a filtering type to be applied to the email.

At B, the sender of incoming email 151 is identified by component 109. In one embodiment, this information can be obtained from identifiers 153 of the email sender that are associated with incoming email 151.

At C, the reputation of the email sender is determined by component 109. In one embodiment, information related to the email sender can be obtained from a database of reputation data 155 that is accessible by the involved email system or systems associated with the involved email system.

At D, a classification of an email sender is made by component 109 based on the reputation of the email sender. In one embodiment, the classification of an email sender can be determined by reference to a table such as a classification lookup table and/or algorithm 157 (see Table 3).

At E, the type of filtering operations that are to be performed by an email filter 107 on the email message 151 is determined by component 109. In one embodiment, the determination of the type of filtering operations to be performed by email filter 107 on email message 151 is based on the classification of the email sender. In one embodiment, the classification of the email sender can be determined by reference to a table such as a lookup table and/or algorithm 159.

At F, the type of filtering that is to be performed on email 151 is identified to email filter 107. In one embodiment, email filter 107 can then use that type of filtering to process email 151.

Exemplary Email Sender Classification Details

In one embodiment, an email sender's reputation can be based on any attribute that can be used to identify the email sender. An email sender is defined as any logical entity that sends email to an email system, such as a domain with sender ID, an IP or an IP Range or combinations of a domain with sender ID, an IP or an IP Range.

In one embodiment, email senders can be classified using a number of data sources and types. Exemplary data sources and types that can be used to classify users are shown in Table 1 that is provided below.

TABLE 1

DATA SOURCES AND TYPES

Sending and Delivery Volumes Over Time
User Labeled Mail
% of Recipients the Sender Attempted to Reach that did not Exist
Anti-Spam Filter Verdicts
Sender ID Verdicts
Volume Based Reputation - A Score Based on Multiple
Data Sources, e.g.,
External Email Sender Reputation Sources In one embodiment, when classified into various categories, many different filtering options, delivery options and network policies can be specified per category. Exemplary filtering options, delivery options and network policies that can be specified per category are shown in Table 2 below:

TABLE 2

FILTERING OPTIONS, DELIVERY OPTIONS, AND NETWORK POLICIES

Hourly/Daily Volume Limits
Maximum Simultaneous Connections to an MTA
Number of Recipients per Email Allowed
Number of Emails per Connection Allowed
Content Filters Trained Specifically for each Category
Filtering Thresholds set Specifically for each Category, e.g., Aggressive or
UX Policies - Show Different UI Based on Category
Delivery policies per category Sender categorization can be done manually (via escalations or hand-built queries) or created via machine learning algorithms that learn what categorizations provide the most value. This system has been shown to provide value both by handling good/spammer senders in a deterministic manner where good senders are delivered directly to the Inbox, thereby reducing the false positive rate to 0%, and spamming IPs are deleted, reducing the false negative rate for them to 0%. Moreover, the customization of filtering, policies, and thresholds is enabled. Referring to Table 2, delivery policies per category can include but is not limited to: (1) do not delete mail, (2) deliver all mail to inbox, (3) deliver all mail to junk folder, (4) delete all mail, (5) do not allow any mail to inbox and (6) only junk or delete. Referring again to Table 2, UX policies can include but are not limited to: enable images/links and enable unsubscribe functionality. In one embodiment, email can be rendered but associated links can be disabled unless overridden by the email receiver. Moreover, in one embodiment, different versions of content associated with an email can be made accessible based on sender classification.

Table 3 below shows an exemplary set of categories and associated policies according to one embodiment:

TABLE 3

| Category Name | Filter Type | Parameters | Class Description |
| --- | --- | --- | --- |
| Good Senders | Deterministic | Deliver to Inbox No Hourly/Daily Volume Limits | Very Good Senders, Low Complaints, Consistent Sending |
| Mixed Good | Reputation + Content | Do Not Delete Conservative Filtering High Hourly/Daily Volume Limit | Senders With Mixed Content, Low Complaint Volume |
| Mixed Other | Reputation + Content | Do Not Delete | Senders With Mixed Content, Medium to High, Complaint Volume |
| Bad Senders | Deterministic | Delete All | Known Bad Senders Delete on Sight |
| Small Good | Reputation + Content | Do Not Delete Conservative Filtering Low Hourly/Daily Volume Limit | Very Small Senders With Good Consistent Sending Patterns |
| Small Other | Content Filter | Aggressive Filtering Low Hourly/Daily Volume Limit | Senders With Very Low Volumes, Inconsistent Sending or Many Complaints |
| Unknown | Content Filter | Aggressive Filtering Low Hourly/Daily Volume Limit | Any Sender that Has Not Been Seen Before |

In one embodiment, the use by component 109 of the exemplary categories listed above provides a number of tangible advantages as compared to conventional reputation systems. In one embodiment, the use of such by component 109 enables the complete removal of false positives at the delete threshold for the following classes: (1) good senders, (2) mixed good, (3) mixed other, (4) small good. Moreover, in one embodiment, component 109 enables complete removal of all false positives for senders in the good sender class, the ability to tune network limits (hourly/daily volume, connection limits, etc.) for each category separately rather than attempting to set the values per sender, the ability to enable certain UI features for mixed sender categories, the ability to disable reputation features totally for small senders and rely only on content filtering and the ability to maintain approximately the same overall false positive and false negative rate while reducing false positives for categories with good reputation and becoming more aggressive on mail from unknown or poor reputation senders.

Figure 2:
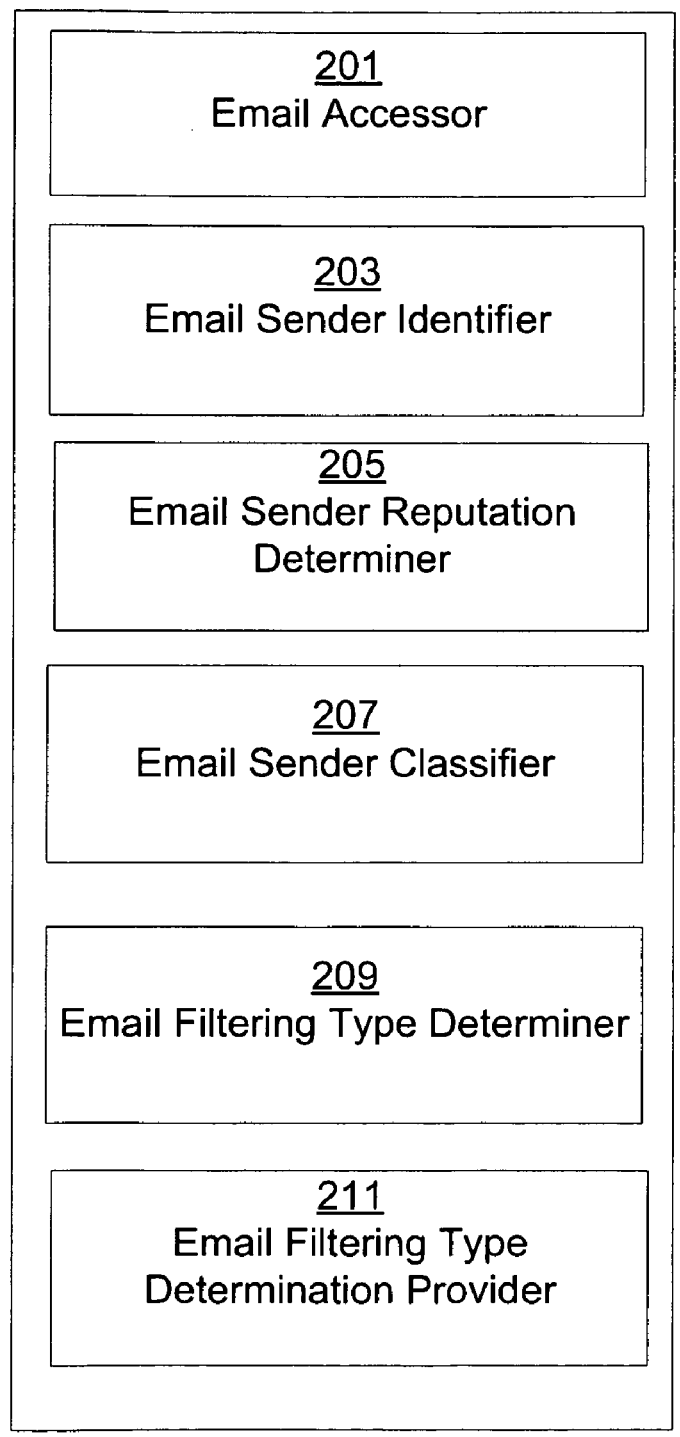
FIG. 2 shows subcomponents of component for determining email filtering type based on sender classification according to one embodiment.

Subcomponents of Component for Determining Email Filtering Type Based on Sender Classification According to Embodiments FIG. 2 shows subcomponents of component 109 (shown in FIG. 1A) for determining email filtering type based on sender classification according to one embodiment. In one embodiment, component 109 implements an algorithm for determining email filtering type based on sender classification. In the FIG. 2 embodiment, system 109 includes email accessor 201, email sender identifier 203, reputation determiner 205, email sender classifier 207, filtering type determiner 209 and email filtering type provider 211.

It should be appreciated that aforementioned subcomponents of component 109 can be implemented in hardware or software or in a combination of both. In one embodiment, subcomponents and operations of component 109 can be encompassed by components and operations of one or more computer programs (e.g., email filter 107 in FIG. 1A). In another embodiment, subcomponents and operations of system 109 can be separate from the aforementioned one or more computer programs but can operate cooperatively with components and operations thereof.

Referring to FIG. 2, email accessor 201 accesses email messages that are received by the email system that is served by component 109. In one embodiment, the email messages that are accessed are analyzed for spam content.

Email sender identifier 203 identifies senders of incoming emails. In one embodiment, email sender identifier 203 can obtain this information from identifiers of the email sender that are associated with the incoming email.

Email sender reputation determiner 205 determines the reputation of an email sender. In one embodiment, reputation determiner 205 obtains reputation information related to the email sender from a reputation server that is accessible by the involved email system or systems associated with the involved email system.

Email sender classifier 207 determines a classification of an email sender based on the reputation of the email sender. In one embodiment, the classification of an email sender can be determined by reference to a table such as a lookup table. In another embodiment, the classification can be determined by an algorithm. In other embodiments, the classification can be determined by a combination of both.

Email filtering type determiner 209 makes a determination of the type of filtering operations to be performed by an email filter on said email message based on said classification. In one embodiment, the type of filtering to use on an email can be determined by reference to a table such as a lookup table. In another embodiment, the type of filtering to use on an email can be determined by using an algorithm. In other embodiments, the type of filtering to use on an email can be determined by a combination of both.

Email filtering type provider 211 identifies the type of filtering that has been determined to be appropriate for an email to an email filtering system. In one embodiment, the email filtering system can then use type of filtering that has been determined to be appropriate on incoming emails.

Figure 3:
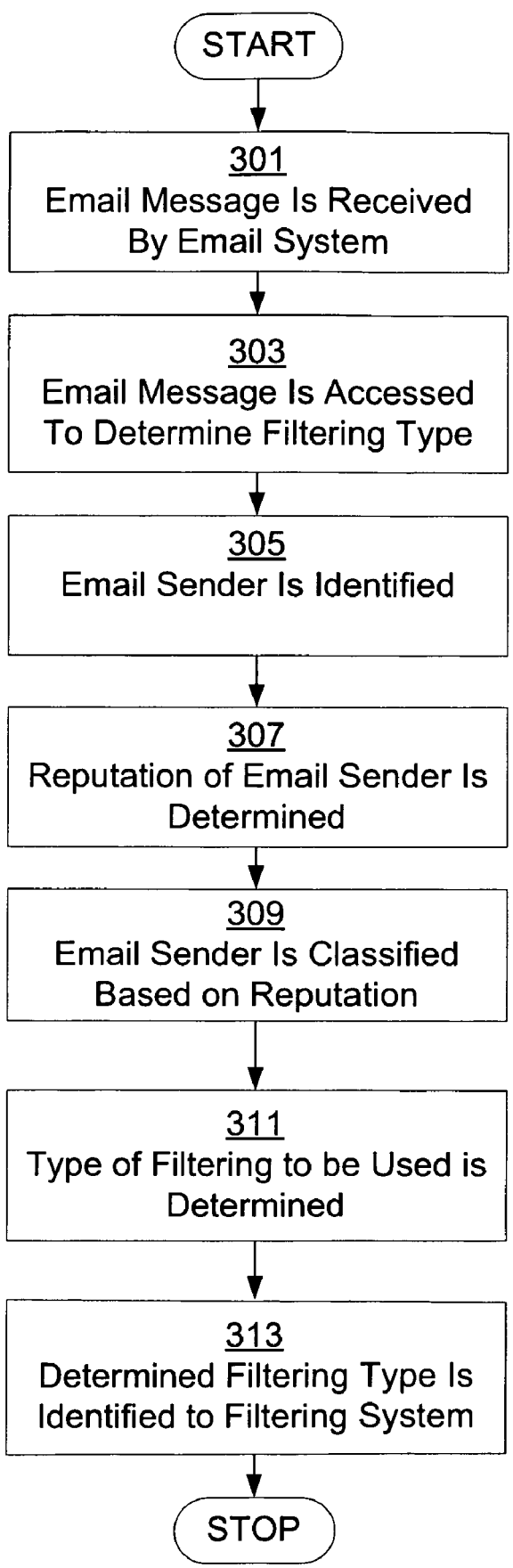
FIG. 3 shows a flowchart of the steps performed in a method for determining email filtering type based on sender classification according to one embodiment.

Exemplary Method for Determining Email Filtering Type Based on Sender Classification According to Embodiments FIG. 3 shows a flowchart 300 of the steps performed in a method for determining email filtering type based on sender classification according to one embodiment. The flowchart includes processes that, in one embodiment can be carried out by processors and electrical components under the control of computer-readable and computer-executable instructions. Although specific steps are disclosed in the flowcharts, such steps are exemplary. That is the present invention is well suited to performing various other steps or variations of the steps recited in the flowcharts. Within various embodiments, it should be appreciated that the steps of the flowcharts can be performed by software, by hardware or by a combination of both.

Referring to FIG. 3, at step 301 an incoming email is received by an email system.

At step 303, the email that is received by the email system is accessed for purposes of determining a filtering type to be applied to the email.

At step 305, the sender of the email is identified. In one embodiment, this information can be obtained from identifiers of the email sender that are associated with the incoming email.

At step 307, the reputation of the email sender is determined. In one embodiment, information related to the email sender can be obtained from a reputation server that is accessible by the involved email system or systems associated with the involved email system.

At step 309, a classification of an email sender is made based on the reputation of the email sender. In one embodiment, the classification of an email sender can be determined by reference to a table such as a lookup table. In another embodiment, the classification can be determined by an algorithm.

At step 311, the type of filtering operations that are to be performed by an email filter on the email message is determined. In one embodiment, the determination of the type of filtering operations to be performed by an email filter on the email message is based on the classification of the email sender.

At step 313, the type of filtering that is to be performed on the email is identified to the email filter. In one embodiment, the email filter can then use type of filtering that has been determined to be appropriate on incoming emails.

Figure 4:
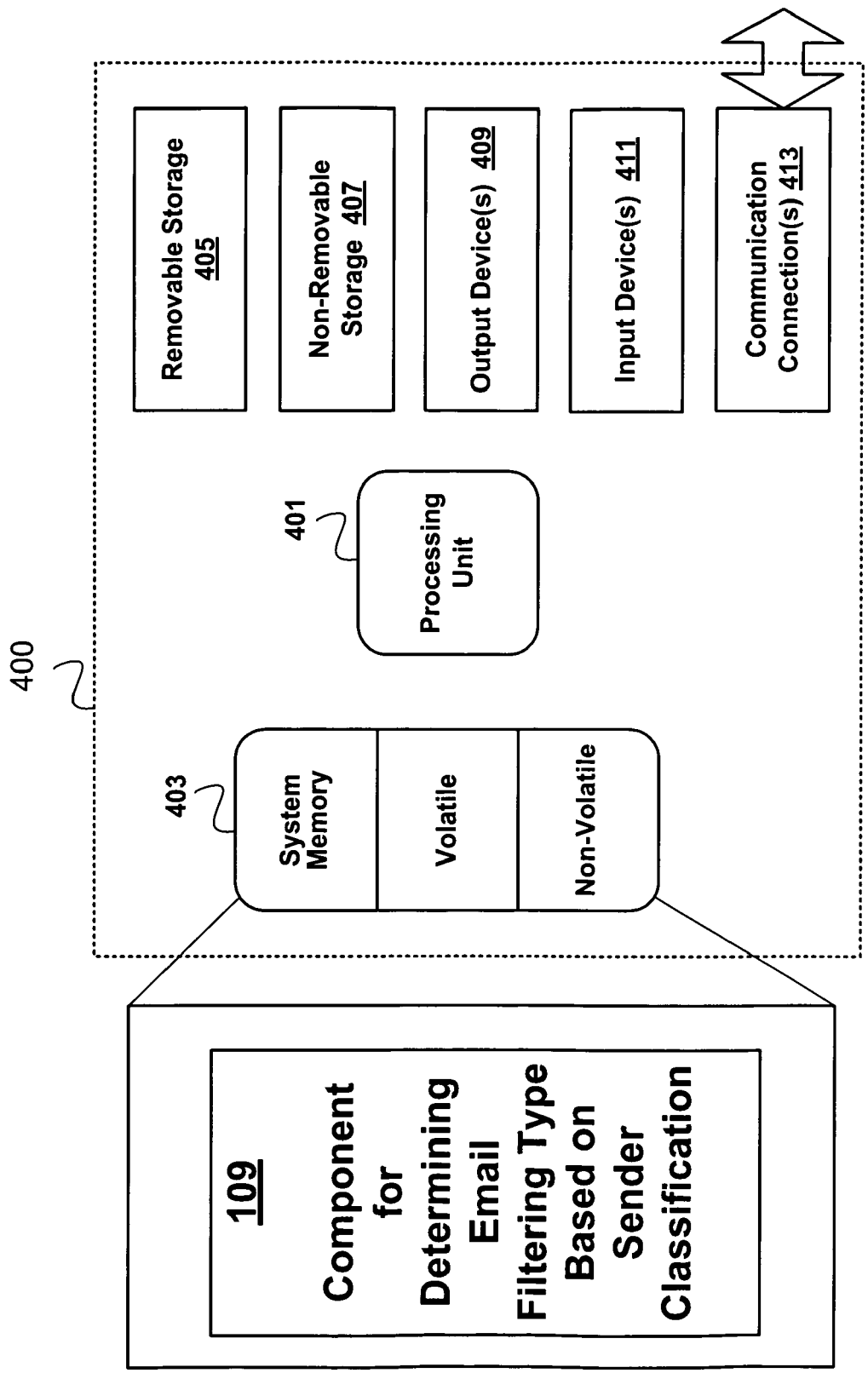
FIG. 4 shows an exemplary computing device according to one embodiment.

Exemplary Hardware Operating Environment of Component for Determining Email Filtering Type Based on Sender Classification According to One Embodiment FIG. 4 shows an exemplary computing device 400 according to one embodiment. Referring to FIG. 4, computing device 400 can be included as a part of a server (e.g., network server 105 in FIG. 1A) and/or an interface device (e.g., computer systems 102a-102n and 112a-112n in FIG. 1A) in accordance with one embodiment. Computing device 400 typically includes at least some form of computer readable media. Computer readable media can be any available media that can be accessed by computing device 400 and can include but is not limited to computer storage media.

In its most basic configuration, computing device 400 typically includes processing unit 401 and memory 403. Depending on the exact configuration and type of computing device 400 that is used, memory 403 can be volatile (such as RAM), non-volatile (such as ROM, flash memory, etc.) or some combination of the two. In one embodiment, as shown in FIG. 1A, a component 107 for determining filtering type based on sender classification (see description of component 107 made with reference to FIG. 1A) can reside in system memory 403.

Additionally, computing device 400, especially the version that can be a part of network server 105 in FIG. 1A, can include mass storage systems (removable 405 and/or non-removable 407) such as magnetic or optical disks or tape. Similarly, computing device 400 can include input devices 409 and/or output devices 411 (e.g., such as a display). Additionally, computing device 400 can include network connections 413 to other devices, computers, networks, servers, etc. using either wired or wireless media. As all of these devices are well known in the art, they need not be discussed in detail.

With reference to exemplary embodiments thereof, determining email filtering type based on sender classification is disclosed. Incoming email is accessed and a sender of the incoming email is identified. The reputation of the sender of the incoming email is determined. An email sender classification is made based on the reputation of the sender. A determination of the type of filtering operations to be performed by an email filter on the email is made based on the classification. The type of filtering operations to be performed by the email filter is identified to the email filter.

The foregoing descriptions of specific embodiments have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for determining email filtering type based on a sender classification, comprising:
   accessing incoming email and identifying a sender of said incoming email;
   determining a reputation of said sender of said incoming email;
   determining, from at least three unique classifications, said sender classification based on said reputation of said sender;
   making a determination of a type of filtering operations to be performed by an email filter on said incoming email based on said sender classification;
   determining parameters of said filtering operations; and
   providing said parameters to said email filter.

2. The method of claim 1, said sender selected from at least one of an authenticated domain, an authenticated address, an IP address, and an IP address range.

3. The method of claim 1, said sender classification based upon at least one of delivery volumes over time, labeled messages, hand crafted lists, volume of junk mail reports, percent of recipients said sender attempted to reach that did not exist, anti-spam filter verdicts, sender ID verdicts, external reputation systems, individual user preferences, and individual user settings.

4. The method of claim 1, said type of filtering operations comprising at least one of deterministic, content, and reputation based filtering.

5. The method of claim 1, said parameters determined as one or more of deliver to inbox, no hourly/daily volume limit, do not delete, delete all, conservative filtering, high hourly/daily volume limit, low hourly/daily volume limit, and aggressive filtering.

6. The method of claim 1, comprising providing a user interface, said user interface based on said sender classification.

7. The method of claim 1, said type of filtering operations to be performed based upon a plurality of specific anti-spam filtering policies that are a function of said sender classification.

8. The method of claim 1, email senders comprising mixed senders that are subjected to individualized filtering that separate wanted email from said mixed senders from unwanted email from said mixed senders.

9. The method of claim 1, email senders comprising senders with good reputations, said senders with good reputation provided more bandwidth than senders with other types of reputations.

10. The method of claim 1, email senders comprising senders with bad reputations, said senders with bad reputations filtered more aggressively than senders with other reputations.

11. The method of claim 1, email senders comprising senders with bad reputations, said senders with bad reputations accorded a limited connection and a limited sending volume and subjected to at least one of deterministic deletion and junking.

12. The method of claim 1, email senders comprising small volume senders, said small volume senders at least one of provided a predetermined limited amount of bandwidth and subjected to deterministic constraints.

13. A method for utilizing reputation information related to an email sender to determine email filtering type, comprising:
retrieving reputation information related to an identified sender of an incoming email;
classifying, from at least three unique classifications, said sender of said incoming email based on said reputation information;
ascertaining a filtering type that corresponds to said classification of said sender of said incoming email;
determining parameters of said filtering type; and
providing said parameters to an email filter.

14. A computer-readable storage device having computer-executable components, comprising:
an email accessing component configured to access an incoming email message and identify a sender of said email message;
a reputation determining component configured to determine a reputation of said sender of said email message;
a sender classification component configured to determine from at least three unique classifications, sender classification based on said reputation of said sender; and
a filtering type determining component configured to make a determination of a type of filtering operation to be performed by an email filter on said email message based on said sender classification.

15. The computer-readable storage device of claim 14, said type of filtering operation to be performed based upon a plurality of specific anti-spam filtering policies that are a function of said sender classification.

16. The computer-readable storage device of claim 14, said sender selected from at least one of an authenticated domain, an IP address and an IP address range.

17. The computer-readable storage device of claim 14, said sender classification based upon at least one of delivery volumes over time, labeled messages, hand crafted lists, volume of junk mail reports, percent of recipients said sender attempted to reach that did not exist, anti-spam filter verdicts, sender ID verdicts, and external reputation systems.

18. The computer-readable storage device of claim 14, said type of filtering operation comprising at least one of deterministic, reputation, and content based filtering.

19. The computer-readable storage device of claim 14, comprising a user interface, said user interface based on said sender classification.

20. The computer-readable storage device of claim 14, said the at least three unique classifications comprising at least one of good senders, mixed good senders, mixed other senders, bad senders, small good senders, small other senders, and unknown senders.

* * * * *